(12) United States Patent
Zurawski

(10) Patent No.: US 9,657,867 B2
(45) Date of Patent: May 23, 2017

(54) POWER CORD SAFETY HOLDER

(71) Applicant: Daniel J. Zurawski, Crystal Lake, IL (US)

(72) Inventor: Daniel J. Zurawski, Crystal Lake, IL (US)

(*) Notice: Subject to any disclaimer, the term of this patent is extended or adjusted under 35 U.S.C. 154(b) by 0 days.

(21) Appl. No.: 15/270,730

(22) Filed: Sep. 20, 2016

(65) Prior Publication Data
US 2017/0082217 A1    Mar. 23, 2017

Related U.S. Application Data

(60) Provisional application No. 62/221,924, filed on Sep. 22, 2015.

(51) Int. Cl.
| *A45F 3/14* | (2006.01) |
| *A45C 13/30* | (2006.01) |
| *F16L 3/127* | (2006.01) |
| *F16M 13/04* | (2006.01) |
| *F16L 3/12* | (2006.01) |
| *F16B 1/00* | (2006.01) |
| *B23D 57/02* | (2006.01) |

(52) U.S. Cl.
CPC ............ *F16L 3/127* (2013.01); *B23D 57/023* (2013.01); *F16B 1/00* (2013.01); *F16L 3/1211* (2013.01); *F16M 13/04* (2013.01); *F16B 2001/0028* (2013.01)

(58) Field of Classification Search
CPC ...................................................... B25B 33/00
USPC ........... 248/51, 52, 74.3, 74.4, 205.2, 282.1, 248/283.1, 285.1, 288.11, 288.31, 296.1, 248/310, 354.6, 354.7, 688, 689, 690, 76, 248/102, 104; 224/219, 222, 267, 270, 224/251, 904; 81/488
See application file for complete search history.

(56) References Cited

U.S. PATENT DOCUMENTS

| 2,261,046 | A |   | 10/1941 | Anderson |           |
|-----------|---|---|---------|----------|-----------|
| 3,155,298 | A |   | 11/1964 | Brown    |           |
| 3,718,241 | A |   | 2/1973  | Forsythe |           |
| 3,809,349 | A |   | 5/1974  | Baedke   |           |
| 4,395,053 | A | * | 7/1983  | Kalfas ................. | A01D 34/822 |
|           |   |   |         |          | 191/12 R  |
| 4,439,896 | A | * | 4/1984  | Matsui ...................... | F16L 3/08 |
|           |   |   |         |          | 24/16 PB  |
| 4,705,245 | A | * | 11/1987 | Osada .................... | F16L 3/233 |
|           |   |   |         |          | 24/16 PB  |
| 4,896,465 | A | * | 1/1990  | Rhodes ............... | A61M 5/1418 |
|           |   |   |         |          | 128/849   |
| 5,413,020 | A | * | 5/1995  | Thompson ............. | G10D 3/163 |
|           |   |   |         |          | 224/220   |
| 5,687,892 | A |   | 11/1997 | Johns    |           |
| 5,758,809 | A | * | 6/1998  | Bonner ..................... | A45F 3/14 |
|           |   |   |         |          | 224/259   |
| 5,784,820 | A | * | 7/1998  | Wood ................... | F41C 33/001 |
|           |   |   |         |          | 42/94     |
| 5,930,931 | A | * | 8/1999  | Watson .................. | F41A 23/04 |
|           |   |   |         |          | 206/317   |

(Continued)

*Primary Examiner* — Terrell McKinnon
*Assistant Examiner* — Michael McDuffie
(74) *Attorney, Agent, or Firm* — Charles F. Meroni, Jr.; Meroni & Meroni, P.C.

(57) ABSTRACT

A customized arm supported safety device and a power cord attachment for an electrical appliance. Typical implementations of said attachment is for trimmers for a bush, a vacuum cleaner, an electric drill, or other power tool.

12 Claims, 6 Drawing Sheets

(56) References Cited

U.S. PATENT DOCUMENTS

| | | | | |
|---|---|---|---|---|
| 5,979,851 | A * | 11/1999 | Purdy | A45F 5/02 |
| | | | | 224/250 |
| 6,336,578 | B1 | 1/2002 | Maynard | |
| 6,845,923 | B1 * | 1/2005 | Slotsve | B05B 7/2478 |
| | | | | 222/174 |
| 7,244,070 | B2 * | 7/2007 | Burnett | G03B 17/00 |
| | | | | 248/118 |
| 7,337,502 | B2 * | 3/2008 | Mermelshtein | B65D 63/1072 |
| | | | | 24/16 PB |
| 7,727,003 | B2 | 6/2010 | Ceroll | |
| 8,177,109 | B2 | 5/2012 | Hagler | |
| 8,782,910 | B1 * | 7/2014 | Lofton | B27B 17/00 |
| | | | | 224/269 |
| 2004/0084489 | A1 * | 5/2004 | Murphey | A45F 5/00 |
| | | | | 224/221 |
| 2004/0255471 | A1 * | 12/2004 | Black | A01G 3/053 |
| | | | | 30/296.1 |
| 2007/0145087 | A1 * | 6/2007 | Mikesell | B25H 3/006 |
| | | | | 224/269 |
| 2010/0001028 | A1 * | 1/2010 | Titshaw | A45F 5/00 |
| | | | | 224/251 |
| 2011/0290833 | A1 * | 12/2011 | Koerner | A45F 5/02 |
| | | | | 224/222 |
| 2013/0299652 | A1 * | 11/2013 | Graham | F16M 11/041 |
| | | | | 248/205.1 |

* cited by examiner

POWER CORD SAFETY HOLDER

This application claims benefit to provisional application No. 62/221,924 filed by Daniel Zurawski on Sep. 22, 2016.

BACKGROUND OF THE INVENTION

Field of the Invention

The present invention generally relates to an arm supported safety device and a power cord attachment for an electrical appliance. Typical implementations of said attachment is for trimmers for a bush, a vacuum cleaner, an electric drill, or other power tool. One intended use of the invention is that that if a user are stepping up a ladder, the cord of the power tool is always in a position that is away from your feet so that as you are stepping up the ladder, or if you are trimming some bushes, the safety device is designed to keep the cord away from the feet and body of the person doing the trimming. Thus, the safety device can minimize the likelihood of the user falling off the ladder because of a problem in the management of the cord during the trimming procedure.

Discussion of the Prior Art

U.S. Pat. No. 3,718,241 ('241 Patent), which issued to Forsythe discloses a Safety Belt. The '241 Patent consists of a safety belt, made of a non-conductive material, to which are attached two or more loops for holding the electric cord of a power tool when in use. The loops can be opened and closed by snap fasteners, for the rapid insertion and removal of the said cord, and when the belt is worn in the usual manner around the waist of the person using the power tool, the loops are located in the back of the person thus always keeping the electric cord out of the way of the user.

U.S. Pat. No. 6,336,578 ('578 Patent), which issued to Maynard, discloses a Wearable Cord Holder. The '578 Patent describes a cord holder for use with hand-held equipment that requires a power cord, air hose, or the like. The cord holder has a clip that attaches over a pocket or belt or similar item of apparel. A loop and hook securely hold a bight of the cord. The cord in front of the cord holder goes to the equipment, and has a desired amount of slack as selected by the user. Because of the secure attachment of the cord within the cord holder, the cord behind the cord holder may be pulled as the user moves about, without affecting the slack in the cord in front of the cord holder.

U.S. Pat. No. 7,727,003 ('003 Patent), which issued to Caroll et al., discloses a Cord Protector for Power Tools. The '003 Patent describes a power tool having a housing, a motor disposed in the house, a power cord connected to the motor, and a cord protector openably engaging the power cord. The cord protector comprising at least one elastically-deformable biasing member engaging the power cord and exerting a biasing force upon the power cord in response to a load being applied to the power cord and recovering to an initial position in response the removal of the load.

U.S. Pat. No. 8,177,109 ('109 Patent), which issued to Hagler et al., discloses a Method and Apparatus for Support of a Medical Device. The '109 Patent describes a catch plate provided for supporting the weight of a tool by a connected cable. The catch plate includes an elongate formable body with a through opening at one end for attaching the plate to a vertical surface, and a hook feature formed in the elongate body at the end opposite the through opening, the hook feature disposed at an angle away from the plance of the elongate body and formable around the connected cable.

SUMMARY OF THE INVENTION

A difficulty for many users of power tools, whether they be homeowners, contractors, landscapers, or simply hobbyists is that battery-powered tools are typically expensive, have low power, and/or low battery life. On the other hand, power tools that utilize power cords often cannot reach certain areas, and the cords themselves are cumbersome and can become tangled, and can pose a hazard to the user. Often certain users will purchase a device that utilizes an internal combustion engine (gas powered) if the cords are a problem in their typical line of work, however electricity is often preferable to gas because of fumes and cost. In addition, the option of purchasing a new device is impractical as it would require replacing the millions of corded electric power tools currently deployed in the field. Thus, there is a need for a way to safely and effectively manage power cords in power tools. Therefore, the present invention relates to a customized adapter, holder, and safety device for power cords.

Such an application is capable of being used with several types of power tools including, but not limited to, vacuums, saws, drills, trimmers, and other applications. Typical uses will involve wearing the adapter on the user's arm to keep excess cordage away from the feet and legs, as well as keep it from being in contact with dangerous areas of the power cord, however other applications are also anticipated by this device. Indeed, a major advantage of the adapter design of the current invention is its universal applicability and adaptability to a wide range of power tools and applications for mechanics, carpenters, plumbers, and in a number of other trades contemplated, but not explicitly recited.

To achieve this result the current safety holder has several unique features that result in a safer environment for using power tools. Firstly, the safety holder resembles an armband with a secure connection, extension, and cord-guide. This allows for one or more cords to be secured safely in place away from the user's body. The cord holder also is adaptable and adjustable to fit the typical user's arm, as well as adjustable with respect to the length the cord is away from the user's body, and adjustable to the power cord itself. In some applications it is also contemplated that several sizes and shapes of the cord holder may be produced to accommodate various uses, or custom safety holders can also be manufactured upon request.

To achieve these objectives, a power cord safety device having the following features is proposed.

In one embodiment the invention contemplates a combination safety device and power tool assembly. The assembly will typically comprise the elements of at least a power tool, the power tool comprising an electrically powered drive and a power cord, a safety device, the safety device comprising a cord holding element mounted to the end of an extension element, a base located at the end of the extension element opposite the cord holding element, and a band attached to the base for securing the safety device to a user, wherein the cord of the power tool is held by the cord holding element. Additionally, in some cases the power tool is a chainsaw. In certain combinations the cord holding element is a ratcheting clip, the extension element is a rod extending away from the base and to the cord holding element, the band is an armband with a hook and loop connecting element affixed to the ends for securely fastening and tightening to the user, and wherein the power cord passes through a loop formed by the ratcheting clip and the ratcheting clip securely holds the power cord. In some embodiments the ratcheting clip is frictionally attached to the power cord when tightened around said cord preventing sliding of the cord through the eye of the ratcheting clip. In other embodiments the extension element is rotatably attached to the base of the safety device such that the extension element and cord holding element can rotate to allow the power cord to more smoothly slide through the cord holding element. Additionally, the extension element may be rotatably attached to the base of the cord holding element such that the cord holding element can rotate to allow the power cord to more smoothly slide through the cord holding element. In other embodiments the extension element is a telescoping rod.

The current invention also contemplates a safety device comprising at least the elements of, a cord holding element mounted to the end of an extension element, a base located at the end of the extension element opposite the cord holding element, and a band attached to the base for securing the safety device to a user. Additionally, there may be additional elements of the cord holding element is a ratcheting clip, the extension element is a rod extending away from the base and to the cord holding element, and the band is an armband with a hook and loop connecting element affixed to the ends for securely fastening and tightening to the user. In certain embodiments the ratcheting clip has at least five teeth for adjusting the size of the central hole of the ratcheting clip. In other embodiments the extension element is rotatably attached to the base of the safety device such that the extension element and cord holding element can rotate to allow a power cord to more smoothly slide through the cord holding element. In still further embodiments the extension element is rotatably attached to the base of the cord holding element such that the cord holding element can rotate independent of the extension element. In certain other ways the extension element is a telescoping rod; or the hook and loop connecting element is affixed to the band with rivets. As can be seen in certain embodiments a connecting element spanning between the extension element and the base forming a triangle and supporting the extension element.

The invention still further contemplates a method of using a power tool, the method having at least the steps of providing a power tool (which may preferably be a chainsaw), providing safety device the safety device comprising a cord holding element mounted to the end of an extension element, a base located at the end of the extension element opposite the cord holding element, and a band attached to the base for securing the safety device to a user, wherein the cord of the power tool is held by the cord holding element, orienting the power tool away from the users body, orienting the safety device on the user's arm such that the extension element is oriented away from the body and the cord is kept away from the body, and operating the power tool. Additionally, in certain instances the cord holding element is a ratcheting clip, the extension element is a rod extending away from the base and to the cord holding element, the band is an armband with a hook and loop connecting element affixed to the ends for securely fastening and tightening to the user, and wherein the power cord passes through a loop formed by the ratcheting clip and the ratcheting clip securely holds the power cord.

Such embodiments do not represent the full scope of the invention. Reference is made therefore to the claims herein for interpreting the full scope of the invention. Other objects of the present invention, as well as particular features, elements, and advantages thereof, will be elucidated or become apparent from, the following description and the accompanying drawing figures.

BRIEF DESCRIPTION OF THE DRAWINGS

Other features of my invention will become more evident from a consideration of the following brief descriptions of drawings.

DETAILED DESCRIPTION OF THE PREFERRED EMBODIMENT

Referring now the drawings with more specificity, the present invention essentially provides a safety device for holding an electrical power cord and allowing a user to manipulate the cord to prevent it from being in the way of power tools as traditionally is an issue in many applications. In addition the cord holder can be modified with several other variables and features discussed below to fit a wide range and variety of tools and users.

Figure 1:
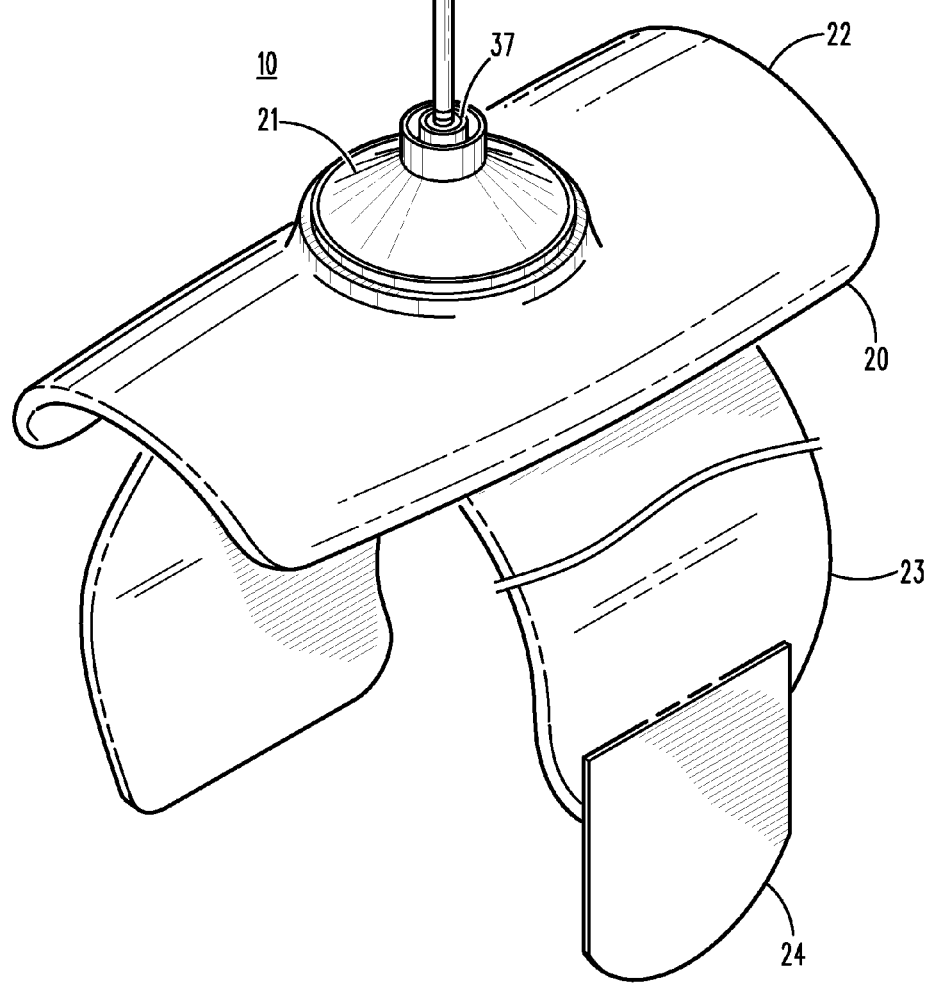
FIG. 1 is a perspective view of a preferred cord holder and safety device according to the present invention.
Figure 2:
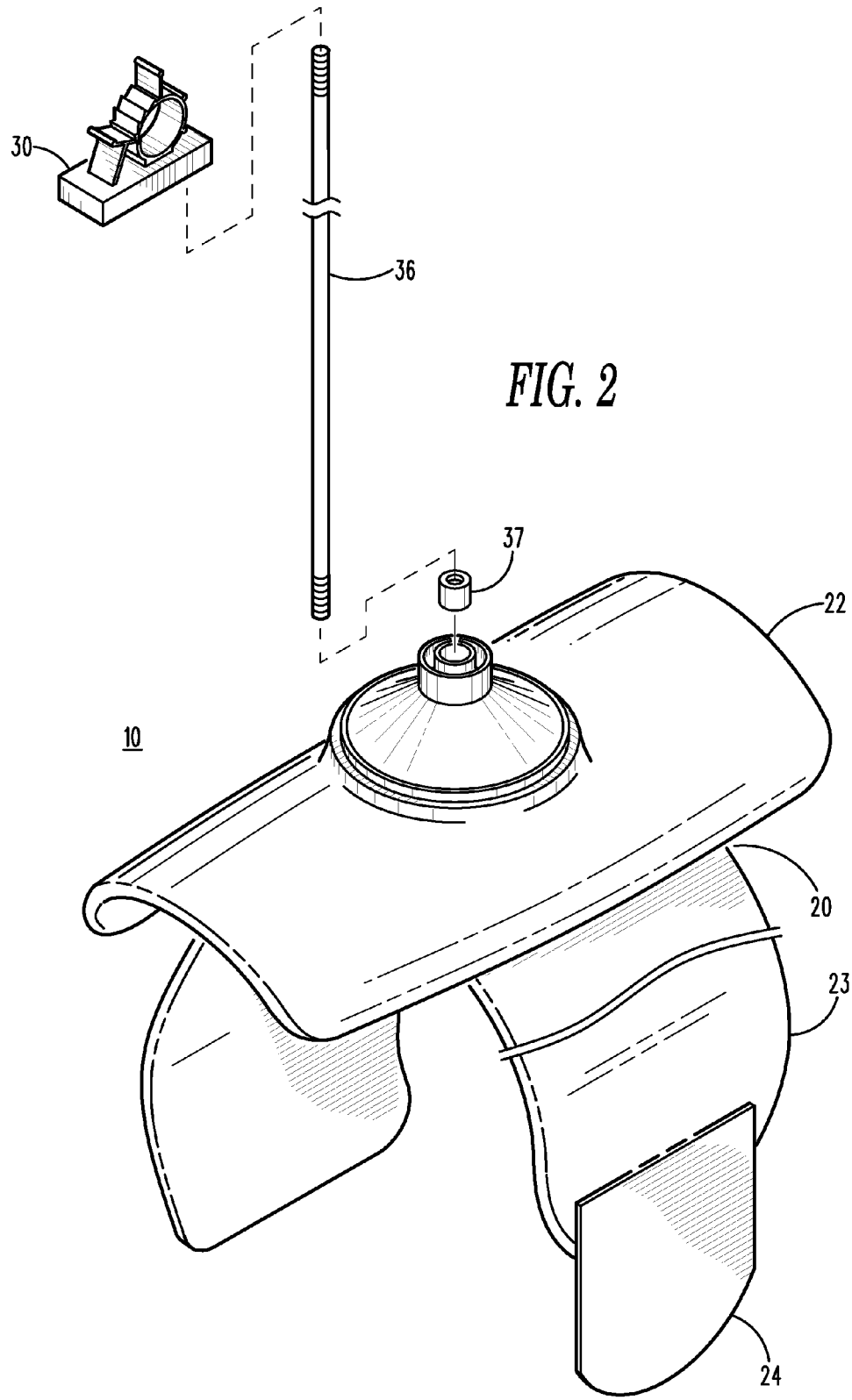
FIG. 2 is an exploded view of the preferred cord holder of FIG. 1 according to the present invention.

Looking now to FIGS. 1 and 2 a representative safety device 10 is shown. Safety device 10 comprises an armband portion 20 and an extension an cord holding portion 30. As shown, cord 40 will pass though the eye 31 of the cord holder 30 guiding it away from the base armband area 20. In a preferred embodiment, the holding portion is a ratcheting clip 32 mounted on a base 30. The clip 32 should have adjustable steps 35 which allow for the accommodation of a wide variety of cords and cord sizes, and also allows the user to tighten the grip around the cord to either let the cord flow freely thought the eye 31 of the clip, or to be securely locked in place by a friction hold on the cord. Thus, if a user wants a predetermined amount of length of cord on one or both ends of the holding portion 30 that can be simply achieved through tightening. In addition extension rod 36 can be adjustable or rigid based on packaging and user preferences to either choose a selected distance the cord should have from the user, or to dynamically change such distance based on the needs of the user and the power tool or other device being used. As can be seen in FIG. 2, rod 36 can be manufactured to have screwed ends so that apparatus 10 can be disassembled for transport or storage. In certain embodiments connecting bolt 37 connects the rod 36 to base 21 of the armband 20. Rod 36 is preferably about 12" in length, but other lengths, including adjustable and telescoping rods have been used. Rod 36 is typically manufactured using steel or another analogous metal, but wood, plastic, PVC, and other materials have been used in various applications for their desirable materials properties.

Shown in more detail in FIGS. 1 and 2 at base 20 it comprises connection point 21, protection plate 22 and armband 23. The connection between base 21, rod 36, and joint 37 can be fixed or rotatable based on the user's preference and the manufacture of the specific embodiment. In addition armband 23 preferably comprises an adjustable strap 24 which may be Velcro or another hook-and-loop adjustable connection. In certain embodiments strap 24 is connected to armband 23 by rivets, but it also may be connected using a hook and loop (Velcro) attachment, sewn into the band, as well as being integrally formed with the strap. The connection may also be elastic in nature or be manufactured using other conventional or newly created fabrics.

Figure 3:
FIG. 3 is a perspective view of the preferred cord holder of FIG. 1 as worn by a user according to the present invention.
Figure 4:
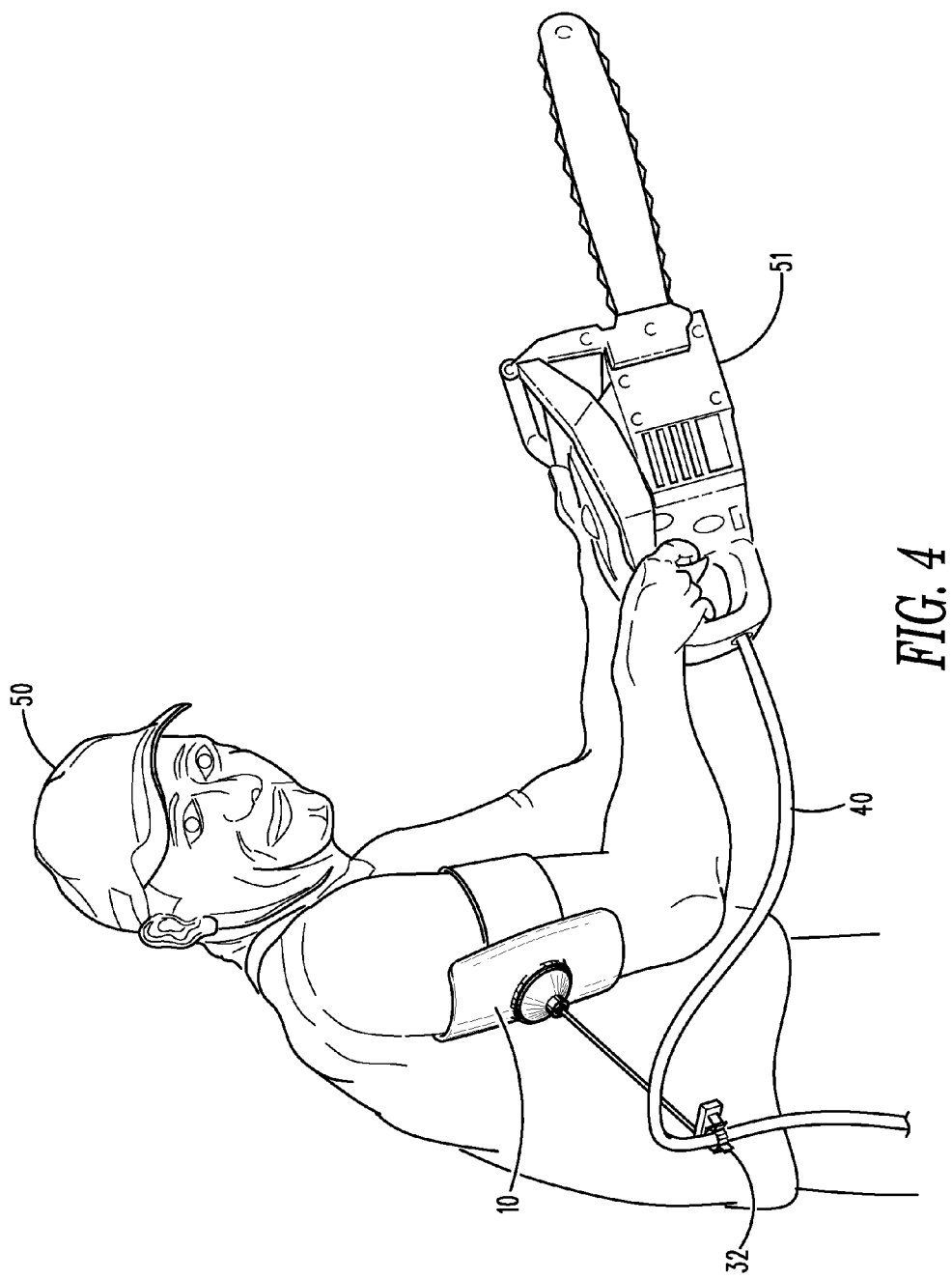
FIG. 4 is a side on perspective view of the preferred adapter of FIG. 1 in combination with an exemplary power tool.

Looking now to FIGS. 3 and 4 safety device 10 is shown in use and in combination with user 50 and exemplary power tool 51. As may become clear upon inspection of the figures the adjustable strap or armband 23 fits around a user's 50 arm or other appendages such as thigh or calf in certain applications. Particularly, looking to Fig. No. 4 exemplary power tool 51 is shown away from the user's body and power cord 40 is shown running through ratcheting clip 32 and thus is significantly displaced away from the body. This thus grants the user greater freedom of movement and prevents entanglement of cord 40 with power tool 51 or the user 50. One typical application is the user climbing a ladder or tree with apparatus 10 equipped as seen in FIG. 4 thus the cord will hand down off of the end 30 of the apparatus and is kept from entangling with the feet improving safety.

Figure 5:
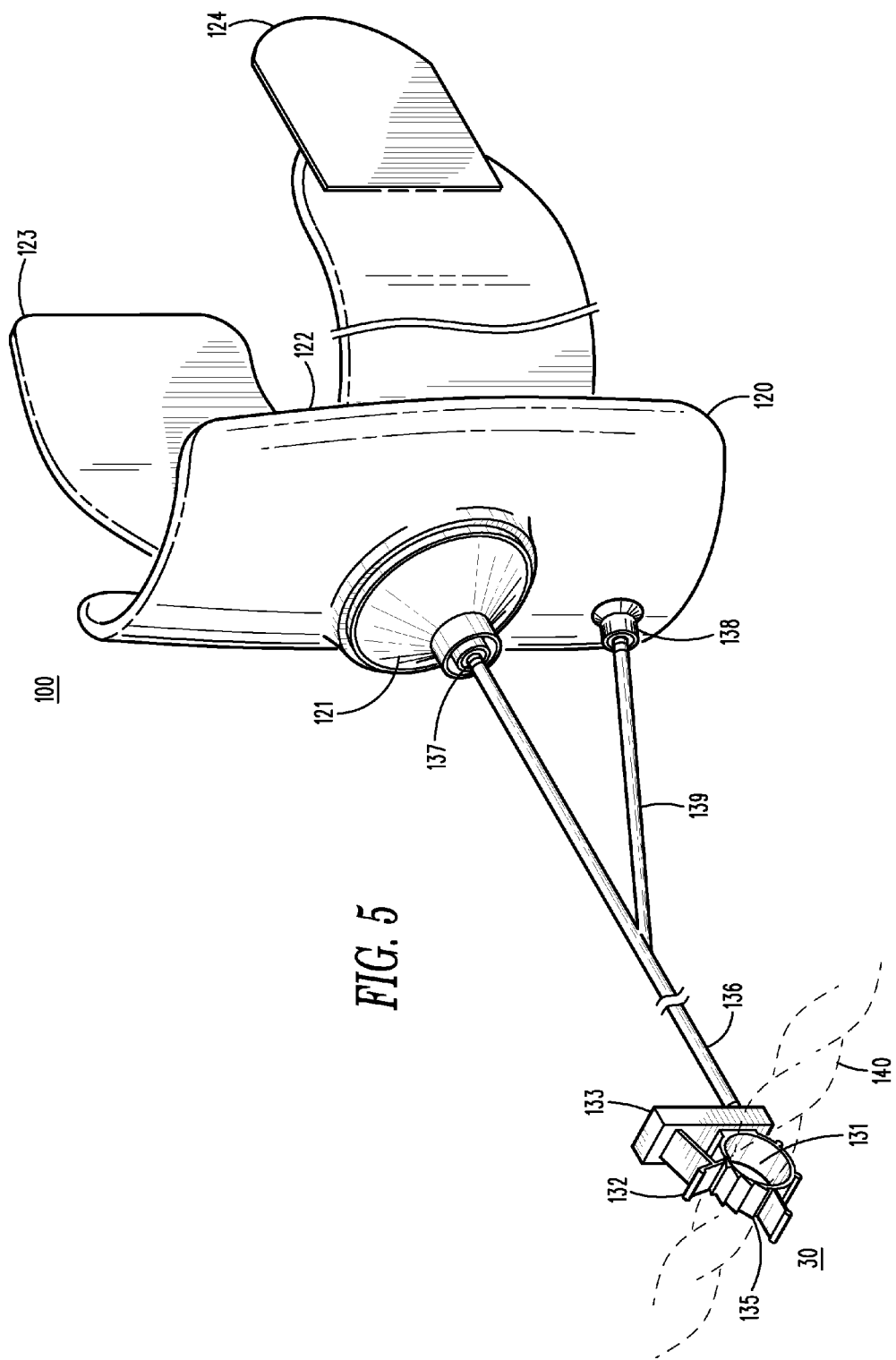
FIG. 5 is a perspective view of an alternative embodiment of the invention as contemplated in the current invention.

Looking now to FIG. 5 an alternative, more robust, safety device 100 is shown. Said robust advice can be utilized with more heavy duty ropes, large cables, and large power cords. In some instances it may be used to install large lines, or take down large lines. Safety device 100 comprises an armband portion 120 and an extension an cord holding portion 130. As shown, cord or rope 140 will pass though the eye 131 of the large cord holder 130 guiding it away from the base armband area 120. In this preferred embodiment, the holding portion is a ratcheting clip 132 mounted on a base 130. The clip 132 should have adjustable steps 35 which allow for the accommodation of a wide variety of cords and cord sizes, and also allows the user to tighten the grip around the cord to either let the cord flow freely thought the eye 131 of the clip, or to be securely locked in place by a friction hold on the cord. Thus, if a user wants a predetermined amount of length of cord on one or both ends of the holding portion 130 that can be simply achieved through tightening. In addition extension rod 136 can be adjustable or rigid based on packaging and user preferences to either choose a selected distance the cord should have from the user, or to dynamically change such distance based on the needs of the user and the power tool or other device being used. In this embodiment connecting bolt 137 connects the rod 136 to base 121 of the armband 120. However, in contrast to previous embodiments, this robust embodiment has additional connecting rod 139 which is secured to base 122 at connection point 138. Rod 136 is preferably about 12" in length, but other lengths, including adjustable and telescoping rods have been used. Rod 136 is typically manufactured using steel or another analogous metal, but wood, plastic, PVC, and other materials have been used in various applications for their desirable materials properties.

As further seen in FIG. 5, this alternative embodiment of the present invention as shown base 120 comprises connection point 121, protection plate 122 and armband 123. The connection between base 121, rod 136, and joint 137 can be fixed or rotatable based on the user's preference and the manufacture of the specific embodiment. However, rotation is limited in this embodiment due to connection 139 and connection point 138. In addition armband 123 preferably comprises an adjustable strap 124 which may be Velcro or another hook-and-loop adjustable connection. In certain embodiments strap 124 is connected to armband 123 by rivets, but it also may be connected using a hook and loop (Velcro) attachment as well as being integrally formed with the strap. The connection may also be elastic in nature or be manufactured using other conventional or newly created fabrics.

Figure 6:
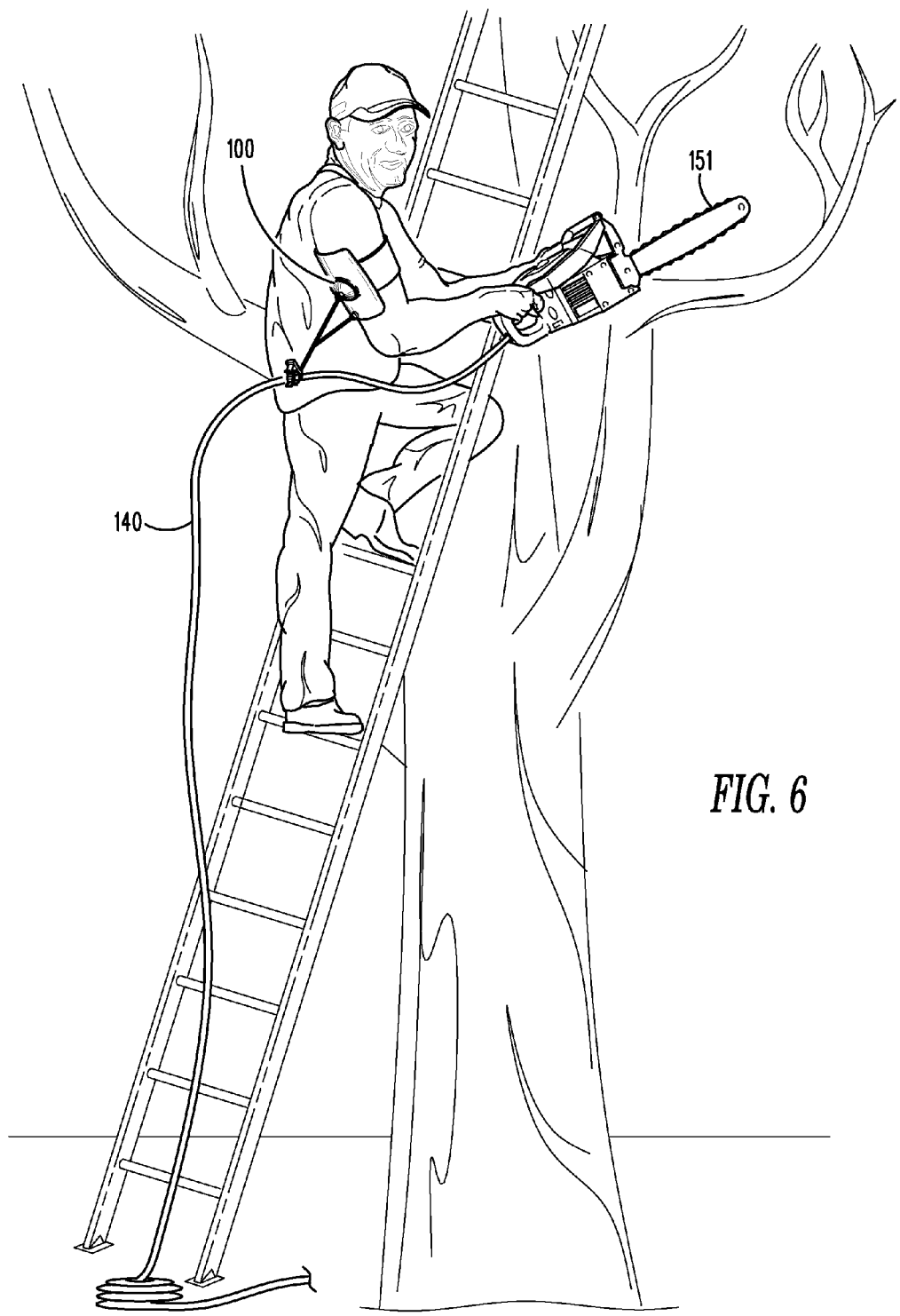
FIG. 6 is a side on perspective view of the preferred adapter of FIG. 5 in combination with an exemplary power tool with user elevated.

As also can be seen in FIG. 6, alternative embodiment 100 can be used in combination with a power tool 151. This demonstrates one key advantage of the invention where cord or rope 140 falls away from the feet and legs of the user.

Accordingly, although the invention has been described by reference to certain preferred and alternative embodiments, it is not intended that the novel arrangements be limited thereby, but that modifications thereof are intended to be included as falling within the broad scope and spirit of the foregoing disclosures and the appended drawings.

I claim:

1. A combination safety device and power tool assembly comprising: a power tool, the power tool comprising an electrically powered drive and a power cord; a safety device, the safety device comprising a cord holding element mounted to the end of an extension element, a base located at the end of the extension element opposite the cord holding element, and a band attached to the base for securing the safety device to a user; wherein the cord of the power tool is held by the cord holding element, wherein the cord holding element is a ratcheting clip; the extension element is a rod extending away from the base and to the cord holding element; the band is an armband with a hook and loop connecting element affixed to the ends for securely fastening and tightening to the user; and wherein the power cord passes through a loop formed by the ratcheting clip and the ratcheting clip securely holds the power cord, wherein the extension element is a telescoping rod.

2. The combination of claim 1 wherein:
the power tool is a chainsaw.

3. The combination of claim 2 wherein: the ratcheting clip is frictionally attached to the power cord when tightened around said cord preventing sliding of the cord through the eye of the ratcheting clip.

4. The combination of claim 2 wherein: the extension element is rotatably attached to the base of the safety device such that the extension element and cord holding element can rotate to allow the power cord to more smoothly slide through the cord holding element.

5. The combination of claim 4 wherein:
the extension element is rotatably attached to the base of the cord holding element such that the cord holding element can rotate to allow the power cord to more smoothly slide through the cord holding element.

6. A safety device comprising: a cord holding element mounted to the end of an extension element; a base located at the end of the extension element opposite the cord holding element; and a band attached to the base for securing the safety device to a user, wherein the cord holding element is a ratcheting clip; the extension element is a rod extending away from the base and to the cord holding element; and the band is an armband with a hook and loop connecting element affixed to the ends for securely fastening and tightening to the user, wherein the extension element is a telescoping rod.

7. The safety device of claim 6 wherein: the ratcheting clip has at least five teeth for adjusting the size of the central hole of the ratcheting clip.

8. The safety device of claim 6 wherein: the extension element is rotatably attached to the base of the safety device such that the extension element and cord holding element can rotate to allow a power cord to more smoothly slide through the cord holding element.

9. The safety device of claim 8 wherein:
the extension element is rotatably attached to the base of the cord holding element such that the cord holding element can rotate independent of the extension element.

10. The safety device of claim 6 wherein: the hook and loop connecting element is affixed to the band with rivets.

11. A method of using a power too comprising: providing a power tool; providing safety device the safety device comprising a cord holding element mounted to the end of an extension element, a base located at the end of the extension element opposite the cord holding element, and a band attached to the base for securing the safety device to a user and further providing a connecting element spanning between the extension element and the base forming a triangle and supporting the extension element; wherein the cord of the power tool is held by the cord holding element; orienting the power tool away from the users body; orienting the safety device on the user's arm such that the extension element is oriented away from the body and the cord is kept away from the body; and operating the power tool.

12. The method of claim 11 wherein:
the cord holding element is a ratcheting clip;
the extension element is a rod extending away from the base and to the cord holding element;
the band is an armband with a hook and loop connecting element affixed to the ends for securely fastening and tightening to the user; and wherein
the power cord passes through the loop formed by the ratcheting clip and the ratcheting clip securely holds the power cord.

\* \* \* \* \*